United States Patent [19]

Howard et al.

[11] Patent Number: 5,093,803
[45] Date of Patent: Mar. 3, 1992

[54] ANALOG DECISION NETWORK

[75] Inventors: Richard E. Howard, Highland Park, N.J.; Daniel B. Schwartz, Cambridge, Mass.

[73] Assignee: AT&T Bell Laboratories, Murray Hill, N.J.

[21] Appl. No.: 289,289

[22] Filed: Dec. 22, 1988

[51] Int. Cl.$^5$ .......................... G06G 7/00; G06K 9/66
[52] U.S. Cl. ................................. 364/807; 307/201;
382/14; 382/30; 395/27
[58] Field of Search .................... 382/30, 31, 32, 33,
382/34, 35, 14, 15; 364/807, 811, 819, 820, 862;
307/201

[56] References Cited

U.S. PATENT DOCUMENTS

| | | | |
|---|---|---|---|
| 4,267,580 | 5/1981 | Bond et al. | 364/824 |
| 4,298,953 | 11/1981 | Munroe | 364/825 |
| 4,715,015 | 12/1987 | Mimoto et al. | 365/210 |

FOREIGN PATENT DOCUMENTS

| | | | |
|---|---|---|---|
| 295876 | 12/1988 | European Pat. Off. | 382/30 |
| 1542853 | 3/1979 | United Kingdom | 364/824 |

OTHER PUBLICATIONS

Sage, J. et al., "CCD Analog-Analog Correlator with Four-FET Bridge Multipliers", Japanese J. of Appl. Phys., vol. 19, Supplement 19-1, 1980, pp. 265-268.
Mavor, J. et al., "A Monolithic CCD Programmable Transversal Filter for Analogue Signal Processing", Radio and Electronic Engineer (G.B.), vol. 50, No. 5, May 1980, pp. 213-225.
R5403 Analog-Analog Correlator Convolver Applications, EG&G Reticon ©, 1979.
Bell System Technical Journal, Boyle, W. et al., "Charge Coupled Semiconductor Devices", Apr. 1970, pp. 587-593.
Frederiksen, T., *Intuitive IC Electronics*, McGraw-Hill, pub. 1982, pp. 157-162.
*AIP Conference Proc. 151*, Denker, J. ed., Sage, J. et al., "An Artificial Neural Network Integrated Circuit Based On MNOS/CCD Principles", Amer. Inst. of Physics, 1986, pp. 381-385.

*Primary Examiner*—Stephen M. Baker
*Attorney, Agent, or Firm*—H. T. Brendzel

[57] ABSTRACT

A circuit for realizing controllable analog weights as used, for example, in template matching circuits. Analog weights are obtained by storing charge on two primary capacitors and by controlling the potential difference between the two primary capacitors. The control of charge on the two capacitors is effected with a bridging connection between the two primary capacitors. In one embodiment, the bridging connection contains two switches and an MOS transistor.

10 Claims, 4 Drawing Sheets

ANALOG DECISION NETWORK

BACKGROUND OF THE INVENTION

This invention relates to pattern matching and, more particularly, to a network for matching an input vector signal to a set of vector signals stored within the network.

A wide variety of applications exist in which it is desirable for a machine to automatically recognize, analyze and classify signal patterns. One such application, for example, is found in the field of imaged character recognition. That is, printed fonts, or hand written characters are presented to the character recognition system, and the task is to identify the characters. Often, such identification can be made through pattern matching of the signals representing the characters with some preset templates. One such system is disclosed in a copending application, filed on Dec. 20, 1988, entitled "Imaged Symbol Classification". Another such system is described in U.S. Pat. No. 4,259,661 issued Mar. 31, 1981.

Another area where template matching is very useful is in connection with associative memory. When using an associative memory, the user generally knows only a portion of the desired output signal, or knows the desired signal imperfectly. Template matching permits the system to identify the closest match to a set of stored signals.

Digital computers are ubiquitous and quite powerful, but they do exhibit certain limitations in problem solving. Many classes of problems take such an enormous amount of computation that a solution in real time is not practically possible. Pattern recognition, generally, and template matching, in particular, are examples of such problems.

Until recently, most artisans either suffered the limitations of general purpose digital computers or developed special purpose digital computers to solve their particular problems more efficiently.

On Apr. 21, 1987, U.S. Pat. No. 4,660,166 titled "Electronic Network for Collective Decision Based on Large Number of Connections Between Signals" was issued to J. J. Hopfield, and it renewed efforts to find a compact solution to pattern matching, among others. Hopfield disclosed a generalized circuit having N amplifiers of high gain and an N×N interconnection matrix having N input conductors and N output conductors. The amplifiers exhibit a sigmoid input-output relation, with a minimum and maximum possible output which can be thought of as a "0" and a "1". Each input conductor of the interconnection matrix is connected to the input of a separate one of the amplifiers, and each amplifier has its output terminals (positive and negative) connected to a separate one of the matrix output conductors. Each amplifier has in addition an input capacitance and resistance. Within the interconnection matrix, each input conductor is connected to an output conductor through a resistor.

When used as an associative memory circuit, the input signals that represent the known portion of the information desired are applied to the amplifiers. This alters the state of the circuit. Once the circuit's state is altered, the amplifiers in combination with the feedback interconnection network drive the circuit to a new stable state. The new state produces a unique output that corresponds to the sought information.

Since the amplifiers have a high gain, the alteration in the circuit's state drives the circuit to one of a set of predetermined stable states which presents an output pattern of binary 1's and 0's at the amplifiers' outputs. The state to which the circuit is driven is dictated by the collection of the resistor values in the feedback interconnection network. The values are analog quantities.

The circuit has the potential for being very compact because the only active elements are the amplifiers, and the structure is very regular. On the other hand, creating resistors in semiconductor technology with accurate values is not easy. Furthermore, wide dynamic range for such resistors is difficult to achieve. That is, it is difficult to create both resistors of very low values and resistors of very high values.

Another difficulty relates to the fact that in a semiconductor IC realization of this circuit, it is difficult to alter the values of the resistors. Furthermore, a modification to even one of the templates that are stored in the interconnection network results in required changes to all of the resistors. The reason for this is that the information about the stored templates is distributed throughout the interconnection network.

These problems were solved with a circuit disclosed in a copending application by H. P. Graf titled "A Computation Network," which was filed in the U.S. Patent Office on Jan. 20, 1987, and bears the Ser. No. 005,248, now U.S. Pat. No. 4,901,271. It contains two networks that store the templates, and an n-tuple network. The three networks are circularly connected. In the Graf network, the stored templates are not comingled and, therefore, the storage of the template information can take on the binary values of the templates. The storage is realized with flip-flops, dedicated to each bit. Means are also disclosed for implementing the process of storing the information in those bits, and for thereby altering the stored information. Each of the template-storing networks merely contains a set of input busses and a set of output busses. Each of the input busses contributed to the output of each of the output busses under control of the flip-flops that store the templates. In one of the template-storing networks, a template is stored in the flip-flops that control a particular output bus. In the other template-storing network, a template is stored in the flip-flops that control a particular input bus.

Pattern matching received a boost from another direction with recent advances in the field of connectionism. Specifically, highly parallel computation networks ("neural networks") have come to the fore with learning algorithms for multi-layered networks in which "hidden" layers of neural elements permit separation of arbitrary regions of the feature space. Use of such a network has indeed been applied to the character classification process, as described, for example, by Gullichsen et al. in "Pattern Classification by Neural Networks: An Experimental System for Icon Recognition", Proceedings of the IEEE First International Conference on Neural Networks, pp IV—725-732, Cardill et al., Editors.

Like the aforementioned Hopfield circuit, these circuits require the ability to multiply input signals by an analog value, and the ability to add the resultant products.

In the charge coupled device (CCD) art, storage of information has been accomplished by recognizing that electric charge can be stored not only in discrete capacitors but also in spatially defined areas of electric potential minima within a semiconductor material. The storage site can be accessed, and location of the site can be changed within the semiconductor in, at least, two dimensions. Thus, electric charge can be stored and moved. One example of such storage devices is found in U.S. Pat. No. 3,858,232, issued to Boyle et al. on Dec.31, 1974.

SUMMARY OF THE INVENTION

Our invention applies some of the basic concepts in the CCD art to the pattern matching field. Specifically, our invention realizes analog weights in template matching circuits by storing charge on two primary capacitors and by controlling the potential difference between the two primary capacitors. That potential difference, which corresponds to the required analog connection weight, is applied to an analog multiplier. The second input of the multiplier is connected to the signal to be multiplied.

The control of charge on the two capacitors is effected, in accordance with our invention, with a bridging connection between the two primary capacitors. In one embodiment, the bridging connection contains two switches and a controlled capacitance device, such as an MOS transistor, therebetween.

In another embodiment, the bridge contains three switches and two controlled capacitance devices therebetween. The latter embodiment, permits an efficient controlled reduction in the magnitude of the potential difference between one and two primary capacitors.

Means are also provided to detect the value of the potential difference between the primary capacitors for storing that difference in a memory pad for comparing that difference to a value stored in the memory.

DETAILED DESCRIPTION

Figure 1:
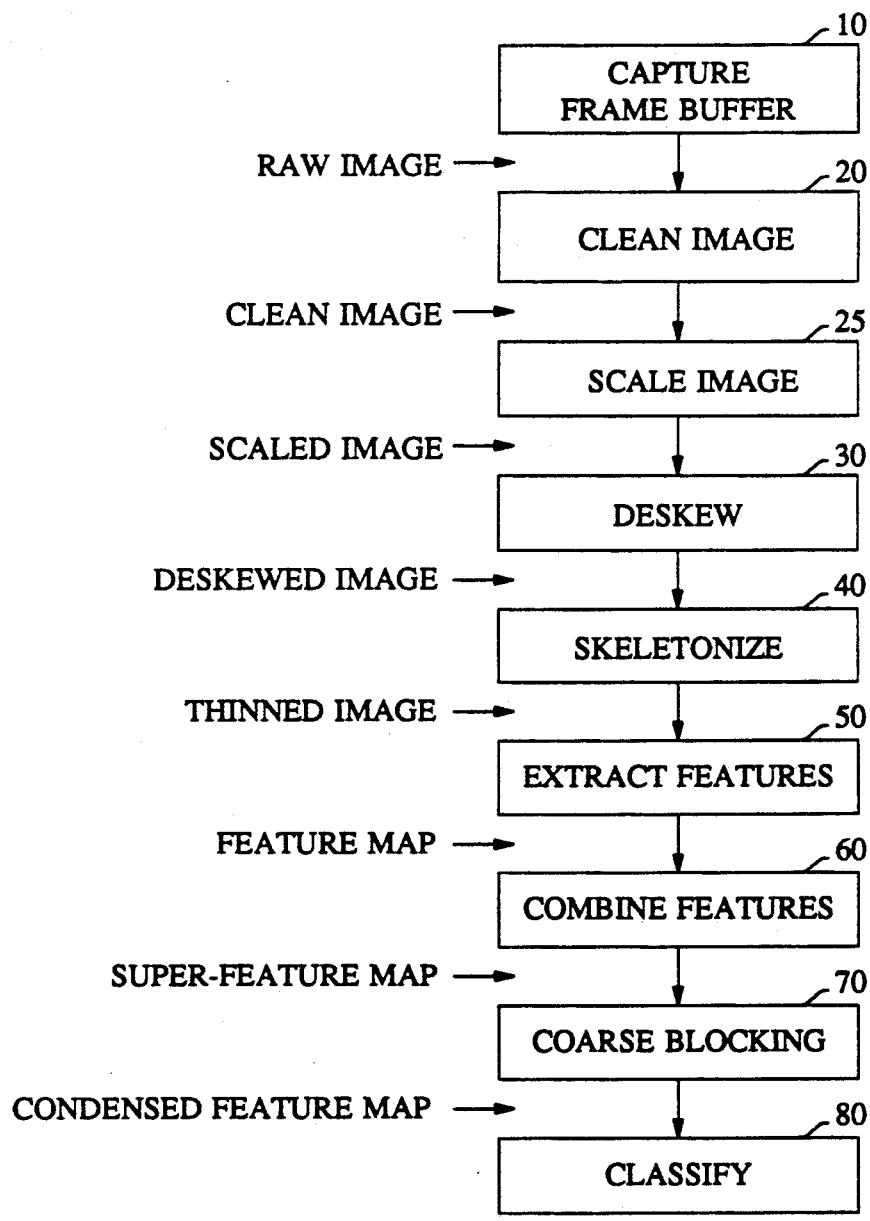
FIG. 1 presents a general flow diagram of a classification method.

FIG. 1 presents a flow chart of a process for character or symbol classification. It is disclosed in detail in the aforementioned copending application titled "Imaged Symbol Classification". In block 10, the character image is captured and stored in a frame buffer. In blocks 20 and 25, the image is cleansed of "smudges" and other extraneous strokes, and scaled to a preset size. In blocks 30 and 40 the cleansed and scaled image is deskewed to remove the slant in the character, and skeletonized to make the image lines as thin as possible. Blocks 50 and 60 extract the features of the thin and upright image, and block 70 reduces the size of the signal vector that describes the found features. Lastly, block 80 classifies the available feature information into one of a set of characters that is known to the classifier.

A number of the FIG. 1 blocks are realizable with pattern matching circuits, but the block that gains most from a two-layer, analog weight, pattern matching network is block 80.

The reason why the two-layer, analog weight, network is so useful for realizing block 80 is that, although we recognize that certain important features of characters are important, we do not exactly know how we recognize them. For example, we neither know how we recognize a "4", nor the limits of when we can recognize a "4" and when we are so unsure as to decline to make a decision. Yet, we know a "4" when we see one!

Current research attempts to solve this problem by having the classifier circuit "learn", through trial and error, to reach the correct decisions. The structure that has the potential for such "learning" is the two-layer, analog weight structure depicted in FIG. 2. This learning technique is commonly referred to as "back propagation." See D. E. Rumelhart et al. in "Learning Internal Representations by Error Propagation", in D. E. Rumelhart, J. L. McClelland (Eds.), Parallel Distributed Processing: Explorations in the Microstructure of Cognition, MIT Press, 1986, Chap. 8.

Figure 2:
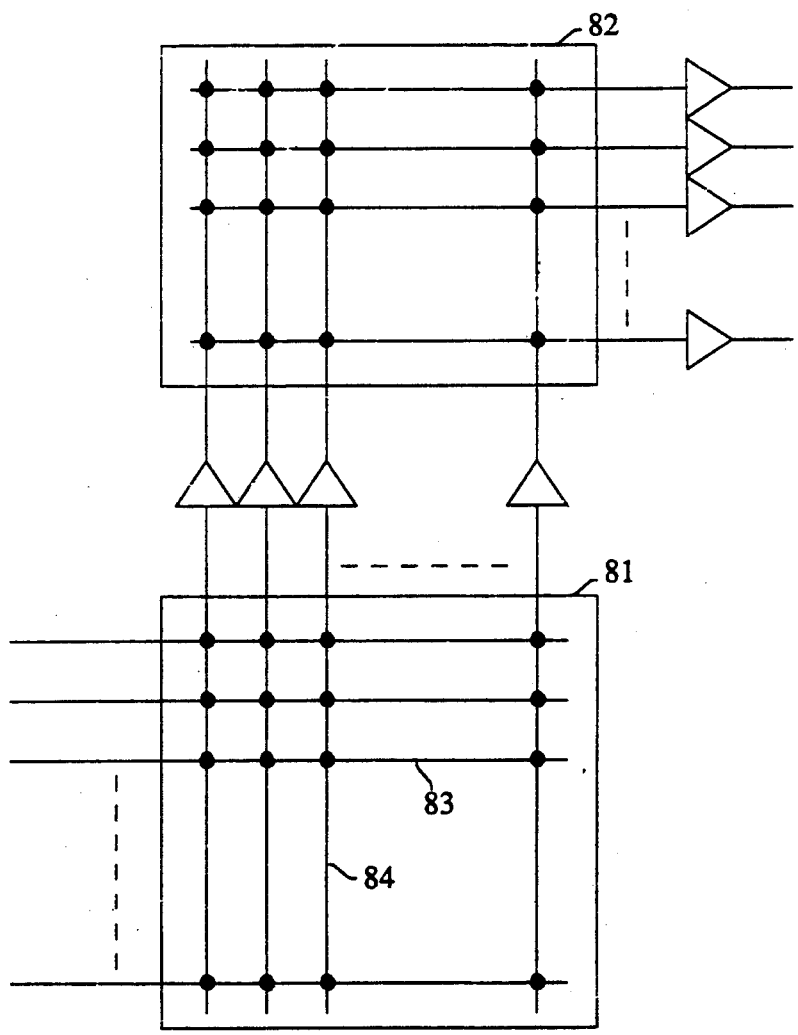
FIG. 2 depicts the structure of a two-layer neural network with analog-valued connection weights.

FIG. 2 comprises interconnection networks 81 and 82 that are serially connected. The input signal set is applied at the input of network 81, and the output signal set appears at the output of network 82. Each of the networks has a plurality of input and output leads, and each input lead is connected to all of the output leads. More specifically, each input lead i is connected to each output lead j through a connection weight $w_{ij}$. In the FIG. 1 application, network 81 has 270 input leads and 40 output leads. Network 82 has 40 input leads and 10 output leads. The number of input leads of network 81 is dictated by the length of the applied signal vector. The number of outputs of network 82 is dictated by the number of characters in the classifying set. The number of intermediate leads (in this case, 40) is determined heuristically.

Training of the FIG. 2 circuit is carried out by applying a feature vector developed from a known character, and adjusting the weights in both network 81 and 82 to maximize the output signal at the designated output lead of network 82 corresponding to the known character. All available samples of all the characters in the set to be classified are applied to the network in this fashion, and each time, the weights in the interconnection network are adjusted to maximize the signal at the appropriate output lead. In this manner, a set of weights $w_{ij}$ is developed for both networks.

It may be appropriate to explicitly mention that since connection weights $w_{ij}$ are analog in nature, the FIG. 2 circuit also operates in an analog fashion. That is, the voltage at any output lead of network 81 is a sum of the contributions of the "fired up" weights connected to that output lead. Each weight is "fired up" by the binary signal on the input lead to which the weight is connected. Thus, the output at lead j equals $$\sum_i B_i w_{ij}$$

where $B_i$ is the value of the $i^{th}$ input lead (0 or 1).

Though the concept of such a learning network is fairly well understood, the task remains to realize such an analog circuit efficiently and compactly. The requirements on such a circuit are not trivial. For example, the minimum weight change, or modification, must be fairly small if optimization of the network is to be achieved. The iterative improvement methodology described above is based on the heuristic assumption that better weights may be found in the neighborhood of good ones, but that heuristic fails when the granularity is not fine enough. We found that for our small network 81, at least 8 bits of analog depth are necessary. Larger networks may require even finer granularity. The weights must also represent both positive and negative values, and changes must be easily reversible. During the learning and training session the number of changes to the weights can be quite large. Therefore, a practical circuit must allow for quick modification of the weights.

Taking these and other requirements into account, we have created an efficient analog connection weight circuit with MOS VLSI technology.

Figure 3:
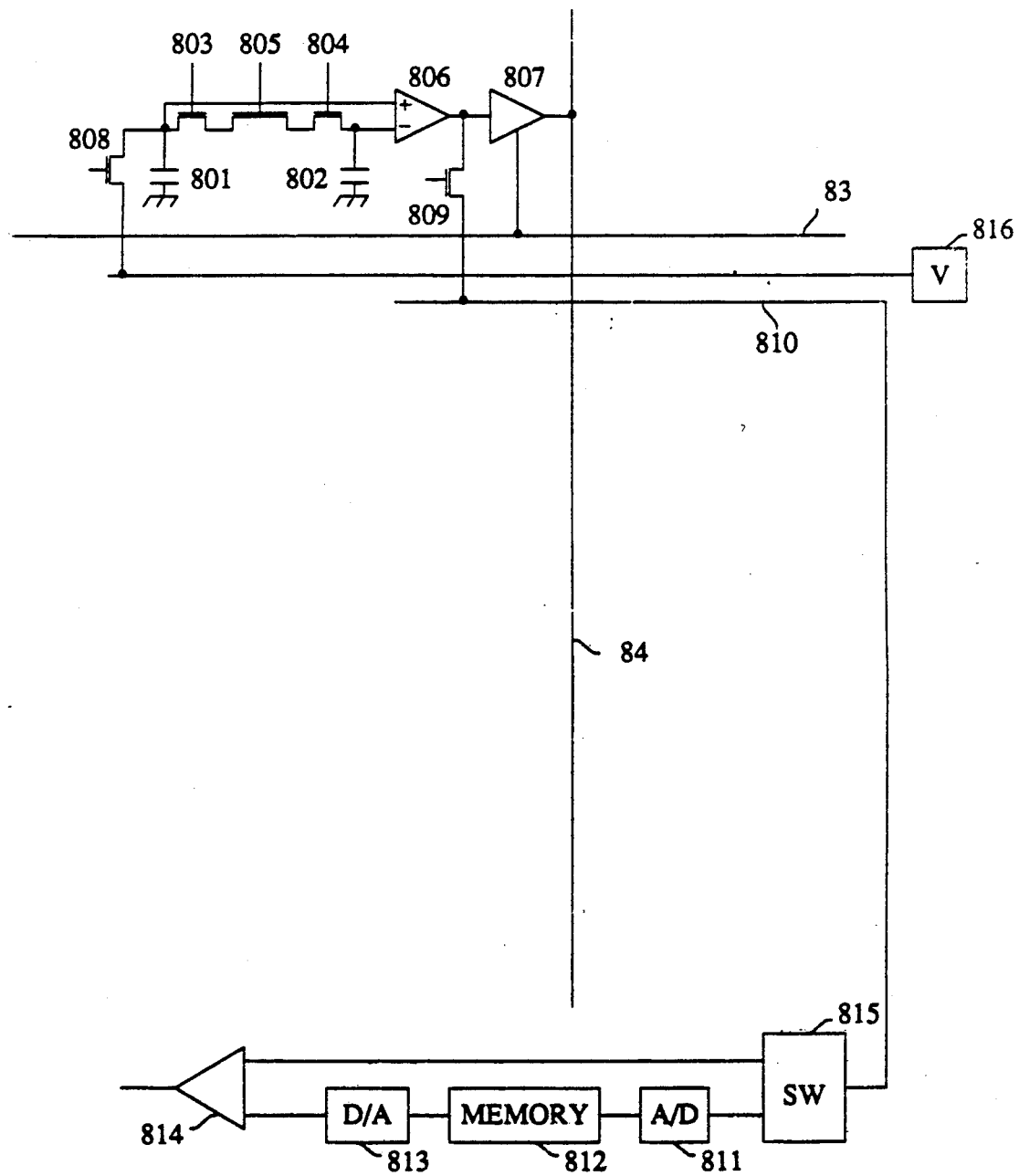
FIG. 3 illustrates one realization for an analog-valued connection weights neural network in accordance with the principles of our invention.

Whereas each connection weight in FIG. 2 is depicted with merely a black dot, FIG. 3 presents our circuit for implementing these dots. More particularly, FIG. 3 shows our connection weight circuit with its connection to input lines 83 and output line 84, as well as some common circuitry. Primarily, the interconnection weight portion of the FIG. 3 circuit includes capacitors 801 and 802, small MOS switches 803 and 804, a relatively large MOS transistor 805, a differential amplifier 806, and a multiplier 807. Secondarily, the circuit of FIG. 3 includes a charge-coupling switch 808, a sensing switch 809 and various control leads.

The circuit operates as follows. Capacitors 801 and 802 are charged to different voltage levels, and the difference in voltage levels is reflected in the output voltage of differential amplifier 806. Amplifier 806 has its two inputs connected to capacitors 801 and 802. The output of amplifier 806, which represents the connection weight, is connected to multiplier 807. Multiplier 807 can be any conventional transconductance amplifier. Also connected to multiplier 807 is input lead 83 of the interconnection network. The output of converter 807 is connected to an output lead of the interconnection network. Thus, multiplier 807 sends a current to the output lead that is a product of the signal at the input lead and the value of the connection weight. The connection weight is represented by the differential voltage developed by amplifier 806 in response to the difference in voltages between capacitors 801 and 802.

We have found that the difference in voltages on capacitors 801 and 802 is maintained for a long time (relative to the operations involved in OCR systems) and that no refreshing is necessary when the circuit is kept at reasonably low temperatures. For example, at 77 degrees Kelvin no detectable loss has been noted with time. It may be observed that one advantage of our circuit is that the weight is proportional to $V_{C801} - V_{C802}$ and, therefore, even a loss in charge—when it is the same at both capacitors—results in no change to the weight.

Nevertheless, it is clear that an avenue must be provided for refreshing the information on capacitors 801 and 802. Moreover, an avenue must be provided for setting a voltage (charge) value on capacitors 801 and 802 and for modifying the set values to allow for the above-described "learning" procedure. This is where the remaining switches and controls come in.

To bring a connection weight to a desired level, switch 808 is closed momentarily to allow a fixed voltage level to be applied to capacitor 801 from voltage source 816. That voltage corresponds to a fixed charge. Thereafter, switch 808 is turned off. At this point, the weight of the connection is at a maximum positive level because capacitor 801 is connected to the non-inverting input of amplifier 806 and carries a positive voltage, while capacitor 802 is connected to the inverting input of amplifier 806. A change in the connection weight is accomplished in the following way.

First, transistors 803 and 805 are turned ON. Transistor 803 is very small compared to transistor 805 and for the sake of a better understanding of what happens, transistor 803 can be thought of as being merely a switch. By comparison, transistor 805 is long and narrow and when it is ON it can be thought of as a capacitor. When switch 803 is closed and transistor 805 is turned ON, the charge on capacitor 801 is distributed between the capacitor (801) and the inversion charge on the turned on transistor 805. Transistor 803 is then turned OFF, thereby trapping the charge in transistor 805. Transistor 804 is then turned ON and when transistor 805 is slowly turned OFF, the mobile charge in its channel diffuses through switch 804 into capacitor 802.

The above steps thus move a quantum of charge from capacitor 801 to capacitor 802. That corresponds to a change in the capacitors' voltages and in the interconnection weight.

The above sequence can be repeated as many times as necessary to bring the connection weights to the desired levels. Hence, the optimization of the connection weights can proceed during the training period in this manner, with the result that each interconnection weight in networks 81 and 82 is set to the correct level.

The above description addresses the training aspect of the circuit. Once the learning process is over, means should be provided for 1) determining the values of the weights and 2) refreshing the weights to compensate for losses with time, etc. This is accomplished with the aid of sensing switch 809, a conventional A/D converter, a conventional D/A converter, and a non-volatile memory.

To determine the value of the weights in an interconnection network, sensing switches 809 are sequentially turned ON to allow each amplifier's voltage to appear on sensing bus 810. That voltage is applied to A/D converter 811 and the resulting digital information is stored in memory 812. All of the weight are converted to digital form in this manner and stored in memory 812. During a refresh operation, each connection weight is isolated in the manner described above, but this time the voltage output on sensing bus 810 is compared in amplifier 814 to the analog voltage of D/A converter 813, to which the digital output of memory 812 is applied. Of course, memory 812 is caused to deliver the digital output that corresponds to the refreshed connection weight. Based on the comparison results, the sequence of switching elements 803, 804, and 805 is controlled by the output signal of amplifier 814 to either increase or diminish the voltage of capacitor 801 relative to capacitor 802. The control of directing the output of bus 810 to either A/D converter 811 or to comparator amplifier 814 is effected by switch 815. Should it be necessary to completely discharge both capacitors 801 and 802, the voltage of source 816 can be reduced to zero and switches 803, 804, and 805 can be turned ON. All control signals emanate from control block 850.

As an aside, capacitors 801 and 802 can be created within the semiconductor material that the other MOS transistors are created.

Figure 4:
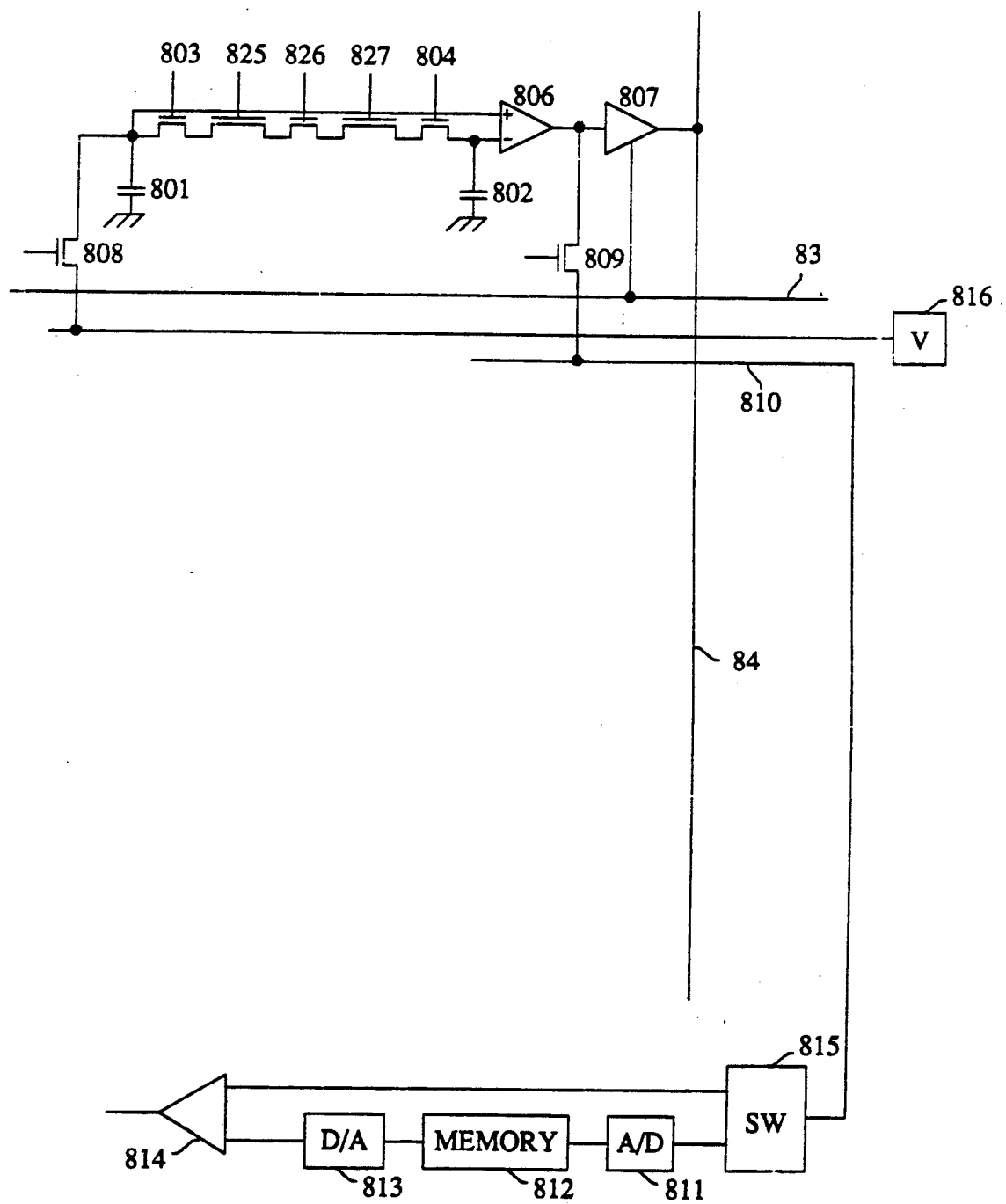
FIG. 4 illustrates another realization for an analog-valued connection weights neural network in accordance with the principles of our invention.

In certain circumstances, such as during the "training" process, it may be advantageous to reduce the magnitude of one of the analog weights. Such a perturbation, or noise, helps the minimization process by allowing the FIG. 2 network to escape local minima. Without first determining whether capacitor 801 carries a larger potential than capacitor 802, it is difficult to perform this function simply with the circuit of FIG. 3. FIG. 4 presents such a circuit.

FIG. 4 is very similar to FIG. 3. The only difference between the two is that MOS transistor 805 of FIG. 3 is replaced in FIG. 4 with the series connection of MOS transistors 825, 826, and 827. Transistor 826 is of minimum size and, like transistors 803 and 804, can be thought of as a mere switch. Transistors 825 and 827 are relatively large transistors, and they can be thought of as capacitors, when they are ON.

The FIG. 4 circuit operates as follows. During a training session when the direction in which charge is to be moved is known, transistor 826 is closed, and transistors 825 and 827 are controlled as a single element. These transistors, therefore, simply combine to form a single capacitor when they are turned ON. The circuit's operation follows exactly the procedure described above in connection with FIG. 3. On the other hand, when it is desired to merely equalize the charges somewhat, transistors 803, 825, 827, and 804 in FIG. 4 are turned ON concurrently while transistor 826 is turned OFF. Charges flow from capacitor 801 to the capacitance formed at transistor 825, and from capacitor 802 to the capacitance formed at transistor 827. After a while, transistors 803 and 804 are turned OFF, and transistor 826 is turned ON. This causes the charges on transistors 825 and 827 to equalize. Finally, transistors 803 and 804 are turned ON and transistors 825 and 827 are turned OFF. This causes the charges on transistor 825 to migrate to capacitor 801, and the charges on transistor 827 to migrate to capacitor 802.

We claim:

1. A circuit for developing an analog potential voltage difference comprising:
   a first capacitor;
   a switch connected between a voltage source and said first capacitor to allow a fixed voltage level to be applied to said first capacitor in response to an initiating control signal;
   a second capacitor for developing said analog potential difference relative to said first capacitor;
   a bridging circuit connecting said first capacitor and said second capacitor, said bridging circuit comprising a series connection of a first switching means, a controllable charge storage means, and a second switching means;
   means for effecting a transfer of charge, equal in quantity to the charge stored in said controllable charge storage means, from said first capacitor to said second capacitor; and
   comparator means, responsive to said first and said second capacitors, for developing said analog voltage that is proportional to the voltage of said first capacitor less the voltage of said second capacitor.

2. The circuit of claim 1 wherein said controllable charge storage means is responsive to a control signal and offers a capacity to store a non-zero amount of charge when said control signal is at one level, and a zero amount of charge when said control signal is at a second level.

3. The circuit of claim 1 wherein said charge storage means comprises an MOS transistor.

4. The circuit of claim 3 wherein said MOS transistor is interposed between said first capacitor and said second capacitor.

5. The circuit of claim 3 wherein a drain lead of said MOS transistor is responsive to said first capacitor, a source lead of said MOS transistor is responsive to said second capacitor, and a gate lead of said MOS transistor is connected to a control terminal.

6. The circuit of claim 1, further comprising a multiplier, responsive to the output voltage of said comparator means and to an input signal.

7. The circuit of claim 1 wherein said charge storage means comprises a series connection of a first MOS transistor, a third switch means, and a second MOS transistor.

8. The circuit of claim 1 wherein said means for effecting a transfer of charge includes means for applying an enabling signal to said first switching means while applying a disabling signal to said second switching means, and for applying a disabling signal to said first means while applying an enabling signal to said second means.

9. A template matching circuit comprising:
   one or more output signal lines;
   one or more input signal lines; and
   a plurality of analog multiplication circuits, each having an output port connected to one of said output signal lines, and an input port connected to one of said input signal lines;
   each of said multiplication circuits comprising a first capacitor; a second capacitor; a bridging circuit for connecting said first capacitor to said second capacitor; comparator means for developing an analog voltage proportional to the voltage difference between said first capacitor and said second capacitor; and analog multiplication means, responsive to said comparator means and to signals on input port of the multiplication circuit, for developing a product signal related to the product of its input port signal and its comparator means output, and for delivering said product signal to said output port of the multiplication circuit;
   wherein said bridging circuit of each of said multiplication circuits comprises a series connection of a first switch, a controllable charge storage means, and a second switch;
   wherein said first switch is responsive to a first control signal;
   said second switch is responsive to a second control signal; and
   said controllable charge storage means is responsive to a third control signal and offers a capacity to store a non-zero amount of charge when said third control signal is at one level, and a zero amount of charge when said third control signal is at a second level; further comprising:
   means for sensing the voltage of each of said comparators;
   means for storing in a memory the output signal of said means for sensing; and
   means for comparing the output signal of said means for sensing with signals stored in said memory.

10. A template matching circuit comprising:
    a first network having a first plurality of input lines and a second plurality of output lines;
    a second network having a second plurality of input lines and a third plurality of output lines, with said second plurality of output lines of said first network being connected to said second plurality of said input lines of said second network; and
    a plurality of analog multiplication circuits, each having an output port and an input port, and each connecting an input lines of one of said networks to an output line of the same network;

each of said multiplication circuits comprising a first capacitor; a second capacitor; a bridging circuit for connecting said first capacitor to said second capacitor; comparator means for developing an analog voltage proportional to the voltage difference between said first capacitor and said second capacitor; and analog multiplication means, responsive to said comparator means and to signals on said input port of the multiplication circuit, for developing a product signal related to the product of its input port signal and its comparator means output signal, and for delivering said product signal to said output port of the multiplication circuit;

wherein said bridging circuit of each of said multiplication circuits comprises a series connection of a first switch, a controllable charge storage means, and a second switch;

wherein said first switch is responsive to a first control signal;

said second switch is responsive to a second control signal; and said controllable charge storage means is responsive to a third control signal and offers a capacity to store a non-zero amount of charge when said third control signal is at one level, and a zero amount of charge when said third control signal is at a second level, further comprising:

means for sensing the voltage of each of said comparators;

means for storing in a memory the output signal of said means for sensing; and means for comparing the output signal of said means for sensing with signals stored in said memory.

* * * * *